(12) United States Patent
Kim et al.

(10) Patent No.: US 10,047,205 B2
(45) Date of Patent: Aug. 14, 2018

(54) RESIN COMPOSITION FOR HIGH SPEED CURING PREPREG FOR CAR BODY PARTS THROUGH PRESS METHOD AND A PREPREG PRODUCT CONTAINING THE SAME

(71) Applicant: Hankuk Carbon Co., Ltd., Gyeongsangnam-do (KR)

(72) Inventors: Jeong Cheol Kim, Gyeongsangnam-do (KR); Suk Won Kang, Gyeongsangnam-do (KR); Dal Saem Jin, Gyeongsangnam-do (KR); Il Seong, Gyeongsangnam-do (KR); Seok Ju Park, Gyeongsnagnam-do (KR)

(73) Assignee: Hankuk Carbon Co., Ltd., Gyeongsangnam-do (KR)

( * ) Notice: Subject to any disclaimer, the term of this patent is extended or adjusted under 35 U.S.C. 154(b) by 0 days.

(21) Appl. No.: 15/163,705

(22) Filed: May 25, 2016

(65) Prior Publication Data

US 2017/0283570 A1     Oct. 5, 2017

(30) Foreign Application Priority Data

Mar. 29, 2016 (KR) .................. 10-2016-0037691

(51) Int. Cl.
*C08J 5/24* (2006.01)
*C08L 63/04* (2006.01)
(Continued)

(52) U.S. Cl.
CPC ............ *C08J 5/24* (2013.01); *C08G 59/4021* (2013.01); *C08J 5/042* (2013.01); *C08L 63/04* (2013.01);
(Continued)

(58) Field of Classification Search
CPC ...... C08J 5/24; C08J 2363/04; C08J 2463/00; C08J 2463/02; C08J 2463/04; C08J 5/024; C08J 2363/00; C08J 2363/02; C08J 5/042; C08L 63/04; C08L 2205/025; C08L 2205/035; C08L 2207/04; C08L 2205/02; C08L 2205/03; C08L 63/00;
(Continued)

(56) References Cited

U.S. PATENT DOCUMENTS

| 4,500,660 A * | 2/1985 | Minamisawa ......... C08G 59/12 523/428 |
| 2008/0081170 A1* | 4/2008 | Tilbrook ................ C08G 59/38 428/292.1 |

FOREIGN PATENT DOCUMENTS

| JP | 2003128764 A | 5/2003 |
| JP | 2005-161797 A | 6/2005 |

(Continued)

*Primary Examiner* — Camie S Thompson
(74) *Attorney, Agent, or Firm* — Harness, Dickey & Pierce, P.L.C.

(57) ABSTRACT

The present invention relates to a prepreg which is manufactured by impregnating thermosetting resin composition and at least one thermoplastic additive into unidirectional carbon fiber, and to a resin composition for high speed curing prepreg for car body parts through press method and a prepreg product containing the same by differentiating a resin constituent, a resin equivalent weight, viscosity, gel time and glass transition temperature differing from those described in the prior art.

6 Claims, 2 Drawing Sheets
(2 of 2 Drawing Sheet(s) Filed in Color)

(51) Int. Cl.
  *C08G 59/40* (2006.01)
  *C09D 163/00* (2006.01)
  *C08J 5/04* (2006.01)
(52) U.S. Cl.
  CPC ......... *C09D 163/00* (2013.01); *C08J 2363/04* (2013.01); *C08J 2463/00* (2013.01); *C08J 2463/02* (2013.01); *C08J 2463/04* (2013.01); *C08L 2205/025* (2013.01); *C08L 2205/035* (2013.01); *C08L 2207/04* (2013.01)
(58) Field of Classification Search
  CPC ......... C08L 2666/08; Y10T 428/31511; Y10T 442/2951; B29K 2105/0872; B29K 2307/04; B29K 2063/00; C08G 59/226; C08G 59/38; C08G 59/12; C08G 59/4021; C08G 59/20; C08G 59/40; C09D 163/00; B29C 70/202
  USPC .................. 428/296.1, 297.4, 413; 442/175; 523/427
  See application file for complete search history.

(56) References Cited

FOREIGN PATENT DOCUMENTS

| | | | |
|---|---|---|---|
| JP | 2013-057065 A | | 3/2013 |
| JP | 2013-159696 A | | 8/2013 |
| WO | WO2013-081058 | * | 6/2013 |

\* cited by examiner

RESIN COMPOSITION FOR HIGH SPEED CURING PREPREG FOR CAR BODY PARTS THROUGH PRESS METHOD AND A PREPREG PRODUCT CONTAINING THE SAME

FIELD

The present invention relates to a prepreg including a thermosetting resin composition and at least one thermoplastic additive which are impregnated into unidirectional carbon fiber, and more specifically, to a resin composition for high speed curing prepreg for car body parts through press method and a prepreg product containing the same by differentiating a resin constituent, a resin equivalent weight, viscosity, gel time and glass transition temperature differing from those described in the prior art.

BACKGROUND

Prepreg is a fiber reinforced composite manufactured by combination of a fiber and a matrix of which the main constituent is a resin. Carbon fiber reinforced composites containing carbon fiber and resin are superior in mechanical properties and are widely used in general industrial application such as sporting goods, aircraft and automotive.

These carbon fiber reinforced composites are manufactured by arranging filaments of carbon fiber and formatting prepregs after impregnating a thermosetting resin into carbon fiber having alignment characteristics (forms such as fabric type carbon cross and continuous carbon filament).

Through a method of laminating and forming prepregs, Fiber-Reinforced Plastic (FRP) having excellent mechanical properties and stiffness can be manufactured. This method is, specifically, a method to make a Fiber-Reinforced Plastic prepreg by impregnating a thermosetting resin composition into a fiber-reinforced base material and by curing the thermosetting resin composition under heat and pressure.

Fiber reinforced composites need to satisfy a high quality standard because prepregs are used in manufacturing of the fiber reinforced composites. Preferred prepregs do not have a bad influence on physical properties such as shortened curing time and lessened tensile strength of the composites.

Especially, prepregs manufactured to reduce curing time under a lower temperature are preferred for manufacture of large parts because such low temperatures require less sophisticated heating systems, and much reduced energy costs. Therefore, particularly at low curing temperatures, it would be desirable to provide an advanced epoxy resin system that substantially reduces cure time below that of currently available prepregs.

PRIOR ART

Japanese laid-open patent publication No. 2003-128764

SUMMARY

Technical Problem

The present invention is contrived to solve the problems stated above, one aspect of the present invention is high productivity of prepregs having shorter curing time, compared to that of the prior art, by establishing a thermosetting resin system.

The other aspect of the present invention is to use prepregs in general industrial application, by using a thermoplastic resin and a curing agent, thus producing it rapidly with advanced qualities.

Technical Solution

In one embodiment of the present invention provides a resin composition for prepregs comprising: (a) an epoxy resin comprising a bisphenol A epoxy, a phenol novolac epoxy, a cresol novolac epoxy and a tetraglycidyl diaminodiphenylmethane (TGDDM); (b) 3,3'-(4-methyl-1,3-phenylene)bis(1,1-dimethylurea); and (c) dicyandiamide; wherein the resin composition satisfies the following condition (i): (i) a glass transition temperature of at least 150° C. (DSC) after the resin composition has been heated at 150° C. for 5 minutes.

Another embodiment of the present invention provides the resin composition which satisfies the following conditions: (i) the resin composition is curable to at least 95% after being heated at 180° C. for 2 minutes, (ii) the resin composition is curable to at least 95% after being heated at 150° C. for 5 minutes, (iii) the resin composition is curable to at least 95% after being heated at 130° C. for 7 minutes, (iv) the resin composition is curable to at least 95% after being heated at 100° C. for 26 minutes.

Yet another embodiment of the present invention provides the resin composition which has a viscosity in the range of 400,000 to 600,000 poise at 25° C.

Yet another embodiment of the present invention provides the epoxy resin comprising: the bisphenol A epoxy ranges from 20 to 30 parts per hundred parts epoxy resin (phr); the novolac epoxy ranges from 55 to 70 parts per hundred parts epoxy resin; and the tetraglycidyl diaminodiphenylmethane (TGDDM) ranges from 8 to 12 parts per hundred parts epoxy resin.

Yet another embodiment of the present invention provides the novolac epoxy comprising: the phenol novolac epoxy ranges from 50 to 60 parts per hundred parts novolac epoxy (phr); and the cresol novolac epoxy ranges from 40 to 50 parts per hundred parts novolac epoxy.

Yet another embodiment of the present invention provides a prepreg resulting from applying a coating of the resin composition onto unidirectional carbon fibers which are surface-treated.

Yet another embodiment of the present invention provides a product resulting from curing the prepreg.

Here, in case that the glass transition temperature of the resin composition after being heated at 150° C. for 5 minutes is less than 150° C. (DSC), it is difficult to form prepregs. Also, in case that the viscosity of the resin composition at 25° C. is less than 400,000 poise, flexibility of prepregs can be decreased, and in the case that the viscosity of the resin composition is more than 600,000 poise, formability and mechanical properties can be decreased when manufacturing prepregs. In addition, in case that the epoxy resin ratio is out of the range, the orientation of fibers can be messy when handling the prepreg, and strength of prepregs can decline.

Advantageous Effects

The resin composition of the present invention for high speed curing prepreg for car body parts through press method and the prepreg product can manufacture forming products with excellent qualities and rapid production when mold press forming with complex structures.

The patent or application file contains at least one drawing executed in color. Copies of this patent or patent application publication with color drawing(s) will be provided by the Office upon request and payment of the necessary fee.

DETAILED DESCRIPTION

In one embodiment of the present invention provides a resin composition for prepregs comprising: (a) an epoxy resin comprising a bisphenol A epoxy, a phenol novolac epoxy, a cresol novolac epoxy and a tetraglycidyl diaminodiphenylmethane (TGDDM); (b) 3,3'-(4-methyl-1,3-phenylene)bis(1,1-dimethylurea); and (c) dicyandiamide; wherein the resin composition satisfies the following condition (i): (i) a glass transition temperature of at least 150° C. (DSC) after the resin composition has been heated at 150° C. for 5 minutes.

Another embodiment of the present invention provides the resin composition satisfies the following conditions: (i) the resin composition is curable to at least 95% after being heated at 180° C. for 2 minutes, (ii) the resin composition is curable to at least 95% after being heated at 150° C. for 5 minutes, (iii) the resin composition is curable to at least 95% after being heated at 130° C. for 7 minutes, (iv) the resin composition is curable to at least 95% after being heated at 100° C. for 26 minutes.

Yet another embodiment of the present invention provides the resin composition has a viscosity in the range of 400,000 to 600,000 poise at 25° C.

Yet another embodiment of the present invention provides the epoxy resin comprising: the bisphenol A epoxy ranges from 20 to 30 parts per hundred parts epoxy resin (phr); the novolac epoxy ranges from 55 to 70 parts per hundred parts epoxy resin; and the tetraglycidyl diaminodiphenylmethane (TGDDM) ranges from 8 to 12 parts per hundred parts epoxy resin.

Yet another embodiment of the present invention provides the novolac epoxy comprising: the phenol novolac epoxy ranges from 50 to 60 parts per hundred parts novolac epoxy (phr); and the cresol novolac epoxy ranges from 40 to 50 parts per hundred parts novolac epoxy.

Yet another embodiment of the present invention provides a prepreg resulting from applying a coating of the resin composition onto unidirectional carbon fibers which are surface-treated.

Yet another embodiment of the present invention provides a product resulting from curing the prepreg.

Here, in case that the glass transition temperature of the resin composition after being heated at 150° C. for 5 minutes is less than 150° C. (DSC), it is difficult to form prepregs. Also, in case that the viscosity of the resin composition at 25° C. is less than 400,000 poise, flexibility of prepregs can be decreased, and it the case of the viscosity of the resin composition is more than 600,000 poise, formability and mechanical properties can be decreased when manufacturing prepregs. In addition, in case that the epoxy resin ratio is out of the range, the orientation of fibers can be messy when handling the prepreg, and strength of prepregs can decline.

Suitable resin compositions for the prepregs of the present invention may be selected from among those discussed below. Generally suitable epoxy resins have at least two epoxy groups per molecule. Such resins include, for example, diglycidyl ethers of bisphenols, such as bisphenol A and bisphenol F, epoxy phenol novolacs and multifunctional epoxy resins as well as the halogenated derivatives thereof. Chlorine and bromine are the most common halogens used to form such derivatives. Brominated epoxy can add anti-flammability to the composition. Specifically, the epoxy resin can include glycidyl ether obtained from polyol, glycidyl amine having multiple active hydrogens, polycarboxylic acid glycidyl ester, polyepoxides obtained from oxidizing a compound having multiple double bonds in molecules and so on. Preferably the epoxy resin utilized in compositions can be a blend of different epoxy resins, and it can include at least one epoxy resin component selected from bisphenol-based epoxy resins (for example, bisphenol A based epoxy resins, bisphenol F based epoxy resins, bisphenol S based epoxy resins or tetrabromo bisphenol A based epoxy resins), novolac-based epoxy resins (for example, phenol novolac epoxy resins or cresol novolac epoxy resins) and amine-based epoxy resins (for example, a tetraglycidyl diaminodiphenylmethane, a triglycidyl aminophenol or a tetraglycidyl xylene diamine).

A curing agent of the resin composition of the present invention can be made available as long as it is compound having a radical which can react with an epoxy group. Amine-based curing agent, for instance, includes aliphatic amines (like ethylene diamine, ethylene triamine, triethylene tetramine, hexamethylene diamine or m-xylene diamine), aromatic amines (like metaphenylene diamine, diaminodiphenyl methane, diamino diethyl diphenyl methane or diamino diethyl diphenyl sulfone), tertiary amines (like benzyl dimethylamine, tetramethyl guanidine or 2,4,6-tris (dimethylaminomethyl)phenol), or imidazoles (like base activated hydrogen compound such as dicyandiamide, organic acid dihydrazide such as adipic acid dihydrazide, 2-methylimidazole or 2-ethyl-4-methylimidazole). In addition, anhydride-based curing agent includes aliphatic anhydrides (like poly adipic anhydride, poly (ethyl octadecanoic diacid) anhydride or polysebacic anhydride), alicyclic anhydrides (like tetrahydro phthalic anhydride, hexahydrophthalic anhydride or methyl cyclohexene dicarboxylic acid anhydride), aromatic anhydrides (like phthalic anhydride, trimellitic anhydride, pyromellitic anhydride or glycerol tris trimellitate anhydride) or halogen-based anhydrides (like het acid anhydride or tetrabromophthalic anhydride). Preferred curing agents in accord with the present invention include amine-based curing agent, preferably the base activated hydrogen compound, for low curing temperature and preservation of stability.

In addition, the preferred curing agent of the present invention is a latent curing agent containing dicyanamide, preferably in amounts from 4 to 8 phr, most preferably in amounts from 6 to 7 phr. By latent amine-based curing agent, curing occurs, but a small quantity of a catalyst, namely a curing accelerator, can shorten curing time by a great deal. Likewise, it should be noted that the term catalyst and accelerator are both employed in the art to describe an ingredient that reduces curing time. For low curing temperature and preservation of stability, preferred curing agents in accord with the present invention include amine-based curing agent, especially Dicyandiamide, and it is known in the prior art to employ urea-based catalysts to reduce the curing time achievable with latent amine curing agents alone. Among them, preferred urea-based catalysts include 3,3'-(4-methyl-1,3-phenylene)bis(1,1-dimethylurea), 3-phenyl-1,1-dimethylurea, 3-(3,4-dichlorophenyl)-1,1-dimethylurea (DCMU), 1,1-(4-methyl-m-phenylene)bis(3,3-dimethyl urea) and so on. More preferably compound having two urea groups per molecule, for example 3,3'-(4-methyl-1,3-phenylene)bis(1,1-dimethylurea), can be used. The specific urea catalyst employed in the present invention to achieve the previously unexpected reduction in curing time is 2,4-toluene bis dimethyl urea. This compound, whether as a catalyst component or, as is especially preferred, as a sole catalyst, is preferably employed in amounts of 0.5 to 10 phr, more preferably in amounts from 2 to 6 phr, and most preferably in amounts from 3 to 6 phr.

The above structural formula, 3,3'-(4-methyl-1,3-phenylene)bis(1,1-dimethylurea), is used for a wide range in Epoxy resin Hot Curing system as a latent curing agent. Also, it does not have any halogen atom, so it can be used for a range applied Halogen Free Formulation.

It also has most stable storage stability in One Package Formulation as best latent feature. Furthermore, 3,3'-(4-methyl-1,3-phenylene)bis(1,1-dimethylurea) can be applied as accelerator in the range from 100 to 120° C. as it ideally combines to Dicyandiamide (curing agent).

Thermosetting resin composition can be mixed with the thermosetting resin, the curing agent, other polymer compound as a catalyst (an accelerator), or other component like organic particles, inorganic particles according to its purposes. Preferably, thermoplastic resin can be used as the polymer compound. With mixing thermoplastic resin, the viscosity of the thermosetting resin composition and handling of prepregs will be optimized. Also, the thermosetting resin composition with high polarity can be improved with a better adhesive property.

The thermosetting resin composition further includes at least one additive. Preferably, the additive is selected from Polyvinylformal (PVF), carboxyl terminated butadiene acrylonitrile (CTBN) and Core-sell rubber (CSR). The additive preferably ranges from 1 phr to 10 phr. This additive improves the toughness and shock resistance of composite.

The thermoplastic resin having C—C bond, amide bond, amide bond, ester bond, ether bond, carbonate bond, urethane bond, urea bond, thioether bond, sulfone bond, imidazole bond or carbonyl bond is preferably used. Among the thermoplastic resins, Polyacrylate, Polyamide, Polyaramid, Polyester, Polycarbonate, Polyphenylene sulfide, Polybenzimidazole, Polyimide, Polyetherimide, Polysulfone, Polyether sulfone, Polyvinyl acetal, or Polyvinyl formal is more preferably used.

Especially, Polyvinyl compound like Polyvinylacetal (PVA) and Polyvinylformal (PVF) is easily dissolved in epoxy resin through heating, does not impair the heat resistance property, improves adhesive property with carbon fiber and controls the viscosity. Therefore, it is proper as the thermoplastic resin in the present invention.

The example of modified epoxy resin contains dimer acid modified epoxy resin, urethane modified epoxy resin, carboxyl-terminated butadiene acrylonitrile (CTBN), and so on. Among them, it can be used alone or in a mixture of at least two. As elastomer additives, carboxyl-terminated butadiene acrylonitrile (CTBN) is preferable.

The organic particles used in the present invention contain powder of thermoplastic resins, thermosetting resins, elastomers and so on. These particles improve the toughness of resin and the impact resistance of fiber reinforced composite. The amount of organic particles is less than 20 weight percent with respect to the total weight of resin composition. The thermoplastic resins which can be preferably used as the organic particles contain polyamides. The thermosetting resins which can be preferably used as the organic particles contain epoxy resins, phenol resins and so on. The elastomer particles which can be preferably used as the organic particles contain crosslinked rubber particles and core-shell type rubber particles which are graft polymerized by other polymer on the surface of the crosslinked rubber particles.

Furthermore, in the present invention, for controlling rheology of the resin composition and without affecting toughness and growth characteristic of the cured materials, the amount of the inorganic powder like powder silica can be mixed ranging from 0.01 weight percent to 5 weight percent, preferably ranging from 0.02 weight percent to 3 weight percent for the resin composition total weight.

As stated above, in the conventional art, it is more important to lessen curing time by using urea catalysts, than by using latent amine only.

The resin composition of the present invention can be heated at 180° C. for 2 minutes, at 150° C. for 5 minutes, at 130° C. for 7 minutes and at 100° C. for 26 minutes. After heating at 150° C. for 5 minutes, glass transition temperature reaches at least 150° C. (DSC).

Furthermore, the resin composition is expected to have a viscosity ranging from 400,000 to 600,000 poise. Epoxy resin having a viscosity ranging from 400,000 to 600,000 poise is preferable, and it contains several, preferable properties of prepregs.

And also, epoxide equivalent weight (EEW) ranging from 200 to 300 in the resin composition is preferable. For reaching this preferable EEW, high molecular weight resin (for instance, 1000 exceeding molecular weight) and low molecular weight resin (for instance, molecular weight less than 200) are mixed.

Following is explanation of FRP materials. As curing an embodiment of epoxy resin composition after epoxy resin impregnating into reinforcing fiber, the FRP materials having an embodiment of epoxy resin composition as a matrix resin in cured product form can be obtained.

Type of the possible reinforcing fiber is not limited, and various fibers like glass fiber, carbon fiber, graphite fiber, aramid fiber, boron fiber, alumina fiber and silicon carbide fiber is used. Among these reinforcing fibers, at least one can be mixed and used. The carbon fiber can provide especially light-weight, high stiff FRP materials. Among all kinds of the carbon fiber, carbon fiber having 230 to 800 GPa tensile modulus can be used. Carbon fiber having 230 to 800 GPa high tensile modulus is combined with epoxy resin composition in view of balance between stiffness, strength and impact resistance.

Type of reinforcing fiber is not limited, and for example it contains various fiber like long fiber (unidirectional elongated), tow, fabric, mat, knitted fabric, braid and short fiber (chopped less than 10 mm). Here, the long fiber means a monofiber or fiber bundle which has continuous fiber at least 10 mm. Meanwhile, the short fiber is fiber bundle chopped less than 10 mm. Reinforcing fiber bundle arranged unidirectional orient is proper to application field requested for high specific strength and specific rigidity.

FRP material is produced by various methods such as prepreg lamination and formation method, resin transfer formation method, resin injection to film method, hand lay-up method, sheet formation compound method, filament winding method and pultrusion method, and this aspect of method does not have any specific limitation or restriction.

The resin transfer formation method is a method to directly impregnate and cure resin base material into thermosetting resin composition. Because this does not produce an intermediate product such as prepreg, it can decrease costs for formation, and it is advantageously used in production of construction materials like spaceships, aircrafts, railroad cars, automobiles and marine vessels.

The prepreg lamination and formation method produces and/or laminates prepregs as impregnating reinforcing fiber base materials into thermosetting resin composition, so FRP materials can be obtained by permitting the prepregs produced and/or laminated under heating and pressure.

The filament winding method is a method that elongates one or dozens of reinforcing fiber roving with unidirectional orientation together by wrapping one or dozens of reinforcing fiber around a rotation metal core (mandrel) with predetermined angle, and impregnates thermosetting resin composition into the reinforcing fiber. After the wrapping of roving is reaching a predetermined thickness, it cures and removes the metal core.

The pultrusion method is a method to elongate continuously the reinforcing fiber with elongation machine for impregnating thermosetting resin composition through passing impregnation tank filled with liquid thermosetting resin composition, squeeze die and heating die for formation and curing. This method has an advantage of forming FRP material continuously, so it is used to produce FRP material for fishing rods, sticks, pipes, sheets, antennas and building structural components.

Among these methods, prepreg lamination and formation method can be used for providing obtained FRP material high stiffness and strength.

Prepreg can contain an embodiment of the present invention of epoxy resin composition and reinforcing fiber. This prepreg can be obtained by impregnating reinforcing fiber base material into epoxy resin composition of the present invention. Impregnation method contains wet process and hot melt process (dry process).

The wet process firstly, makes generated epoxy resin composition solution impregnate into reinforcing fiber by dissolving epoxy resin composition into solvent like methyl ethyl ketone or methanol, retrieve, and impregnate directly into reinforcing fiber by removing solvent through evaporation by oven. In the hot melt process, a fluid type epoxy resin composition is impregnated into reinforcing fiber by pre-heating, or coated epoxy resin composition on a piece or pieces of release paper for using this as a resin film. After then, the resin film is placed on a layer or both layers of flat type reinforcing fiber, and this method can be carried by impregnating the resin into reinforcing fiber with heating and pressure. This hot melt process can provide prepreg which does not have any residual solvent.

A sectional density of reinforcing fiber in prepreg may range from 50 to 200 g/m². If the sectional density is at least 50 g/m2, fewer prepreg can be laminated for fixing a predetermined thickness when forming FRP material, and it makes lamination process simpler. Meanwhile, if the sectional density is less than 200 g/m², drapability of prepreg can be improved. A mass fraction of reinforcing fiber of prepreg might be from 60 to 90 mass % in one embodiment, from 65 to 85 mass % in another embodiment, and from 70 to 80 mass % in other embodiment. If the mass fraction of reinforcing fiber is at least 60 mass %, enough fiber content can exist, so it can not only provide advantages of FRP material in view of improved specific strength and specific modulus, but also prevent excessive heating during curing FRP material. If the mass fraction of reinforcing fiber is less than 90 mass %, it makes resin impregnate better and lessens the risk of forming pores on FRP material.

For supplying heating and pressure under the prepreg lamination and formation method, the press formation method, autoclave formation method, bagging formation method, wrapping tape method or internal pressure formation method can be used properly.

The autoclave formation method makes prepreg laminate onto a predetermined-shaped board, and then covers it with bagging film, and cures it with heating and pressure as removing air from laminates. It can permit orientation of fiber to be precisely controlled, as well as provide high quality formation material with improved mechanical property due to minimum pore content. During formation process, the supplying pressure might be from 0.3 to 1.0 MPa, and the temperature of formation might range from 90 to 200° C.

The wrapping tape method is a method to form tube type FRP material by wrapping it with prepreg for circumference of a rod which mandrel or other core is eliminated. Such method can be used in production of bar type products like golf shaft, fishing rods and so on. More specifically, such method contains to wrap circumference of mandrel with prepreg, to wrap a thermoplastic film on prepreg under tension for fixing prepreg, and to grant it pressure. After curing resin in oven through heating, a tubular body is obtained by removing a rod which core is eliminated. When wrapping with wrapping tape, used tension may range from 20 to 78N. The temperature of formation may be from 80 to 200° C.

The internal pressure formation method places pre-article obtained by wrapping circumference of tubular body of thermoplastic resin or any other internal pressurizer with prepreg, onto internal metal mold. And then, it grants pressure with high pressure air into internal pressurizer, and simultaneously forms prepreg by heating the metal mold. Such method can be used to produce an object with complex shape, for example golf shaft, bat, and racket for tennis or badminton. During formation process, the granting pressure might be from 0.1 to 2.0 MPa. The temperature of formation may range from 80 to 180° C.

The FRP material produced from prepreg can have Class A surface as mentioned above. Class A surface means a surface which has high finishing quality properties without aesthetic flaws.

Figure 1:
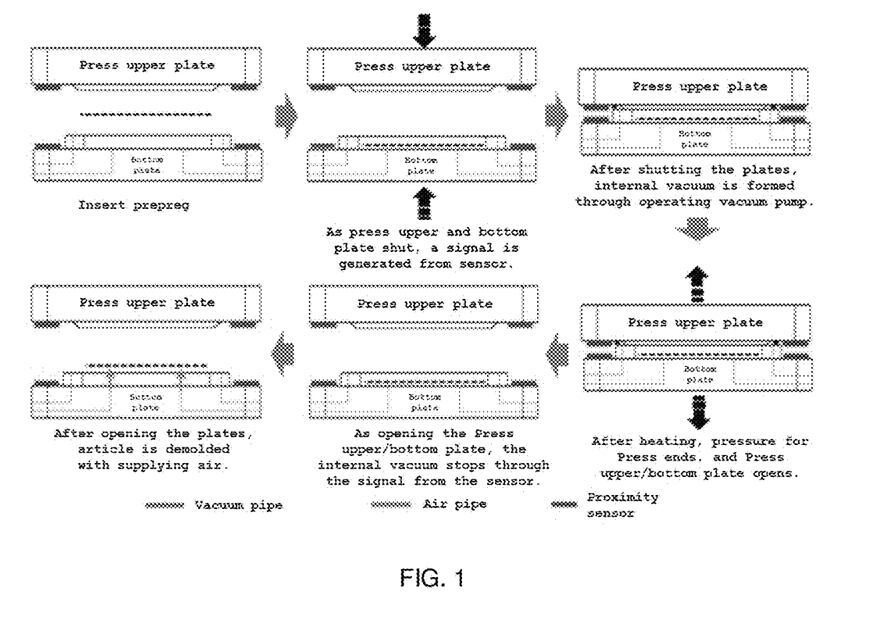
FIG. 1 schematically shows an automatic scenario of the present invention.
Figure 2:
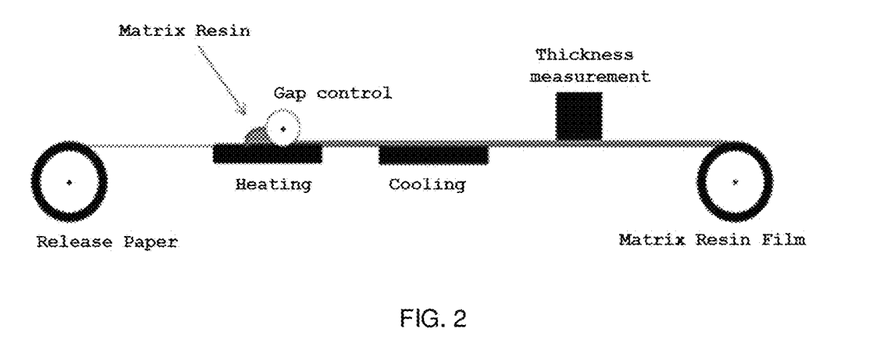
FIG. 2 schematically shows a Resin Paper manufacturing process of the present invention.

In the prepreg production process, there are Resin Paper (R/P) manufacturing process and Carbon Impregnation manufacturing process (C.P.P). FIG. 2 schematically shows a Resin Paper manufacturing process. It is a process to produce Resin Paper by uniformly coating properly processed and mixed resin on a release paper.

Figure 3:
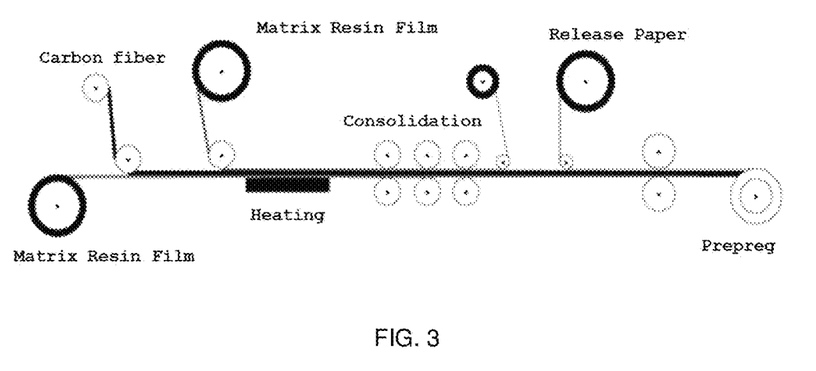
FIG. 3 schematically shows C.P.P. (Carbon Impregnation) manufacturing process of the present invention.

FIG. 3 schematically shows C.P.P (Carbon Impregnation) manufacturing process. It is a process to manufacture Carbon Unidirection Prepreg by impregnating work-completed Resin Paper on unidirectional oriented carbon tow and by making it sheet.

FRP material comprising reinforcing fiber and cured epoxy resin composition obtained from epoxy resin composition is advantageously used in the sport applied field, general industry applied field and aerospace field. Specific sport applied field in which such material is advantageously used contains golf shaft, fishing rod, racket of tennis or badminton, hockey stick and ski pole. Specific general industry field in which such material is advantageously used contains construction material of vehicle like automobiles, bicycles, marine vessels, and railroad cars, drive shaft, leaf spring, windmill blade, pressure vessel, flywheel, paper roller, roof material, cable and repair/reinforcing material.

Tubular body type FRP material manufactured by curing prepreg as a shape of tube is advantageously used in golf shaft, fishing rod and so on.

Resin composition for high speed curing prepreg and a prepreg of the present invention features being manufactured after coating resin composition onto unidirectional carbon fibers which are surface-treated, and provides a product resulting from curing the prepreg. The prepreg is usable in manufacturing sports goods, automobile components and component materials for aerospace and vessel.

Below, statement specifically explains the embodiment. However, the embodiment is an example of the present invention, the present invention scope is not limited hereto.

Below, statement more specifically explains the embodiment.

Embodiment 1
Production of Resin Composition

The resin composition of the present invention spends less curing time in comparison with the epoxy resin composition of prior art. It is available in high temperature (higher than 150° C.) as well as low temperature (for example 100° C.). To improve active curing of the thermosetting resin, curing activator is used to combine with curing agent. This is a system to cure the resin composition at relatively low temperature in short time as Urea series as curing activator combines with Dicyandiamide as amine-group curing agent.

Also, the resin composition of the present invention is curable at least a 95% cure on heating at a temperature of 150° C. for 5 minutes, and such composition has a glass transition temperature (Tg) that does not need to be cooled before being removed from a mold, so production speed can be improved when press forming.

The contents of the epoxy resin composition is shown in the table 1, and the epoxy resin composition comprises a bisphenol A (Epoxy resin A) 29.07 parts per hundred parts epoxy resin (phr), a phenol novolac (Epoxy resin B) 33.90 parts per hundred parts epoxy resin (phr), cresol novolac (Epoxy resin C) 27.73 parts per hundred parts epoxy resin (phr), and a tetraglycidyl diaminodiphenylmethane (TGDDM) (Epoxy resin D) 9.30 parts per hundred parts epoxy resin (phr).

The epoxy resin composition of the present invention were prepared by blending 100 parts of Epoxy resin A, B, C and D, 3 parts of PVF, 8 parts of DICY, and 6 parts of UR500 (DYHARD UR500 of Alzchem AG corp., 3,3'-(4-methyl-1,3-phenylene)bis(1,1-dimethylurea)).

The resin mixture had a viscosity which ranges from 16 poise at 107° C. to 460,000 poise at 25° C.

The gel time was determined by a gel machine and measured each at 100° C., 130° C., 150° C. and 180° C.

Digital Scanning calorimetry was utilized to monitor the time to reach 95% cure, and it is a method to measure the changes in the calorific value depending on the time at constant temperature by Isothermal DSC measurement.

The value of glass transition temperature (Tg) was determined by DSC (TA Instruments TA Q2000) and DMA (TA Instruments Ta Q800).

The viscosity of the resin mixture was determined by the Anton Paar MCR301 Modular Compact Rheometer, and it is measured by increasing temperature from 25° C. to 160° C. at 3° C./minute temperature ramp.

Manufacture of Prepreg

Resin sheet was manufactured by spreading resin mixture on a release paper. The Resin Paper was manufactured with 59 g/m2 (unit weight) of resin which spread on the release paper. And then, the resin paper was placed on the both sides of unidirectional-oriented carbon fiber, and unidirectional prepreg was manufactured by impregnating the resin paper into the carbon fiber with heating and pressure.

Embodiment 2

The content of the epoxy resin composition of the embodiment 2 is given in Table 1, and the epoxy resin composition comprises a bisphenol A (Epoxy resin A) 29.47 parts per hundred parts epoxy resin (phr), a phenol novolac (Epoxy resin B) 34.30 parts per hundred parts epoxy resin (phr), cresol novolac (Epoxy resin C) 28.23 parts per hundred parts epoxy resin (phr), and a tetraglycidyl diaminodiphenylmethane (TGDDM) (Epoxy resin D) 8.00 parts per hundred parts epoxy resin (phr). Except for these changes, prepreg was produced by the same manufacturing method of embodiment 1.

Embodiment 3

The content of the epoxy resin composition of the embodiment 3 is given in Table 1, and the epoxy resin composition comprises a bisphenol A (Epoxy resin A) 28.37 parts per hundred parts epoxy resin (phr), a phenol novolac (Epoxy resin B) 33.20 parts per hundred parts epoxy resin (phr), cresol novolac (Epoxy resin C) 26.93 parts per hundred parts epoxy resin (phr), and a tetraglycidyl diaminodiphenylmethane (TGDDM) (Epoxy resin D) 11.50 parts per hundred parts epoxy resin (phr). Except for these changes, prepreg was produced by the same manufacturing method of embodiment 1.

Embodiment 4

The content of the epoxy resin composition of the embodiment 4 is given in Table 1, and the epoxy resin composition comprises a bisphenol A (Epoxy resin A) 29.07 parts per hundred parts epoxy resin (phr), a phenol novolac (Epoxy resin B) 33.90 parts per hundred parts epoxy resin (phr), cresol novolac (Epoxy resin C) 27.73 parts per hundred parts epoxy resin (phr), a tetraglycidyl diaminodiphenylmethane (TGDDM) (Epoxy resin D) 4.65 parts per hundred parts epoxy resin (phr), and a triglycidyl aminophenol (TGAP) (Epoxy resin D) 4.65 parts per hundred parts epoxy resin (phr). Except for these changes, prepreg was produced by the same manufacturing method of embodiment 1.

COMPARATIVE EXAMPLE 1

The resin composition of the comparative example 1 changed UR500 to UR200 (AlzChem AG corp. Product DYHARD UR200), and also changed structural formula (3-(3,4-dichlorophenyl)-1,1-dimethylurea)) depicted below. The epoxy resin composition comprises a bisphenol A (Epoxy resin A) 29.47 parts per hundred parts epoxy resin (phr), a phenol novolac (Epoxy resin B) 35.00 parts per hundred parts epoxy resin (phr), cresol novolac (Epoxy resin C) 32.53 parts per hundred parts epoxy resin (phr), and a tetraglycidyl diaminodiphenylmethane (TGDDM) (Epoxy resin D) 3.00 parts per hundred parts epoxy resin (phr). Except for these changes, prepreg was produced by the same manufacturing method of embodiment 1.

COMPARATIVE EXAMPLE 2

The resin composition of the comparative example 2 changed from UR500 to UR200 (AlzChem AG corp. Product DYHARD UR200), and also changed structural formula (3-(3,4-dichlorophenyl)-1,1-dimethylurea)). The epoxy resin composition comprises a bisphenol A (Epoxy resin A) 29.47 parts per hundred parts epoxy resin (phr), a phenol novolac (Epoxy resin B) 35.00 parts per hundred parts epoxy resin (phr), cresol novolac (Epoxy resin C) 32.53 parts per hundred parts epoxy resin (phr), and a triglycidyl aminophenol (TGAP) (Epoxy resin D) 3.00 parts per hundred parts epoxy resin (phr). Except for these changes, prepreg was produced by the same manufacturing method of embodiment 1.

COMPARATIVE EXAMPLE 3

The resin composition of the comparative example 3 changed from UR500 to UR200 (AlzChem AG corp. Product DYHARD UR200), and also changed structural formula (3-(3,4-dichlorophenyl)-1,1-dimethylurea)). The epoxy resin composition comprises a bisphenol A (Epoxy resin A) 30.00 parts per hundred parts epoxy resin (phr), a phenol novolac (Epoxy resin B) 35.00 parts per hundred parts epoxy resin (phr), and a cresol novolac (Epoxy resin C) 35.00 parts per hundred parts epoxy resin (phr). Except for these changes, prepreg was produced by the same manufacturing method of embodiment 1.

TABLE 1

|  | Embodiment 1 | Embodiment 2 | Embodiment 3 | Embodiment 4 | Comparative example 1 | Comparative example 2 | Comparative example 3 |
|---|---|---|---|---|---|---|---|
| Epoxy Resin A (Bisphenol A) | 29.07 | 29.47 | 28.37 | 29.07 | 29.47 | 29.47 | 30.00 |
| Epoxy Resin B (Phenol novolac) | 33.90 | 34.30 | 33.20 | 33.90 | 35.00 | 35.00 | 35.00 |
| Epoxy Resin C (Cresol novolac) | 27.73 | 28.23 | 26.93 | 27.73 | 32.53 | 32.53 | 35.00 |
| Epoxy Resin D (TGDDM) | 9.30 | 8.00 | 11.50 | 4.65 | 3.0 | — | — |
| Epoxy Resin D (TGAP) | — | — | — | 4.65 | — | 3.0 | — |
| DICY | 8 | 8 | 8 | 8 | 8 | 8 | 8 |
| UR500 | 6 | 6 | 6 | 6 | — | — | — |
| UR200 | — | — | — | — | 6 | 6 | 6 |
| Viscosity of the resin composition at 25° C. [Poise] | 460,000 | 455,000 | 465,000 | 460,000 | 300,000 | 300,000 | 300,000 |
| G/T 100° C. | 25 min 33 s | 25 min 42 s | 25 min 30 s | 25 min 33 s | 35 min 12 s | 35 min 20 s | 36 min |
| G/T 130° C. | 2 min 50 s | 3 min | 2 min 30 s | 2 min 50 s | 5 min | 5 min | 6 min |
| G/T 150° C. | 40 s | 45 s | 35 s | 40 s | 101 s | 105 s | 2 min |
| G/T 180° C. | 6 s | 8 s | 5 s | 6 s | 28 s | 45 s | 1 min |
| 100° C. 95% cure (DSC Isothermal) | 25 min 50 s | 26 min | 25 min 45 s | 25 min 50 s | 50 min | 51 min | 55 min |
| 130° C. 95% cure (DSC Isothermal) | 6 min 45 s | 7 min | 6 min 40 s | 6 min 45 s | 15 min | 16 min | 20 min |
| 150° C. 95% cure (DSC Isothermal) | 4 min 50 s | 5 min | 4 min 35 s | 4 min 50 s | 10 min | 12 min | 18 min |
| 180° C. 95% cure (DSC Isothermal) | 1 min 40 s | 2 min | 1 min 30 s | 1 min 40 s | 5 min | 6 min | 9 min |
| Tg (DSC) (150° C. 5 min) | 152° C. | 151° C. | 153° C. | 152° C. | 137° C. | 135° C. | 130° C. |
| Tg (DMA Tan Delta) (150° C. 5 min) | 171° C. | 169° C. | 172° C. | 171° C. | 156° C. | 154° C. | 151° C. |

Resin composition and prepreg of the present invention can cure about twice or three times as fast as the comparative examples, and have a Tg that is 10° C. higher than the cure temperature of the comparative one when curing at 150° C. Their shelf life is as good as the slow cured comparative examples.

What is claimed is:

1. A resin composition for prepregs comprising:
   (a) an epoxy resin comprising a bisphenol A epoxy, a novolac epoxy comprising a phenol novolac epoxy and a cresol novolac epoxy, and a tetraglycidyl diaminodiphenylmethane(TGDDM);
   (b) 3,3'-(4-methyl-1,3-phenylene)bis(1,1-dimethylurea); and
   (c) dicyandiamide;
   wherein the epoxy resin comprises:
   the bisphenol A epoxy ranges from 20 to 30 parts per hundred parts epoxy resin(phr);
   the novolac epoxy ranges from 55 to 70 parts per hundred parts epoxy resin; and
   the tetraglycidyl diaminodiphenylmethane (TGDDM) ranges from 8 to 12 parts per hundred parts epoxy resin, and wherein the resin composition satisfies the following condition (i):
   (i) a glass transition temperature of at least 150° C. (DSC) after the resin composition has been heated at 150° C. for 5 minutes.

2. The resin composition for prepregs of claim 1, wherein the resin composition satisfies the following conditions:
   (i) the resin composition is curable to at least 95% after being heated at 180° C. for 2 minutes,
   (ii) the resin composition is curable to at least 95% after being heated at 150° C. for 5 minutes,
   (iii) the resin composition is curable to at least 95% after being heated at 130° C. for 7 minutes,
   (iv) the resin composition is curable to at least 95% after being heated at 100° C. for 26 minutes.

3. The resin composition for prepregs of claim 1, wherein the resin composition has a viscosity in the range of 400,000 to 600,000 poise at 25° C.

4. The resin composition for prepregs of claim 1, wherein the novolac epoxy comprising:
   the phenol novolac epoxy ranges from 50 to 60 parts per hundred parts novolac epoxy(phr); and
   the cresol novolac epoxy ranges from 40 to 50 parts per hundred parts novolac epoxy.

5. A prepreg resulting from applying a coating of the resin composition of claim 1 onto unidirectional carbon fibers which are surface-treated.

6. A product resulting from curing the prepreg of claim 5.

* * * * *